Patented Jan. 1, 1924.

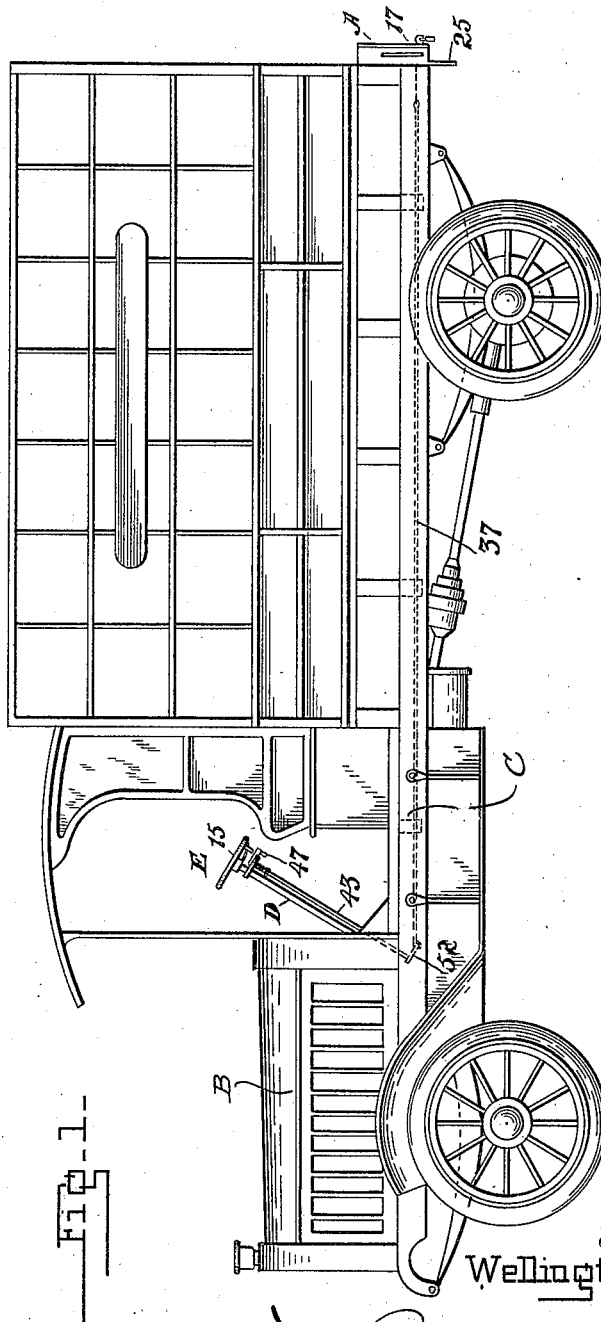

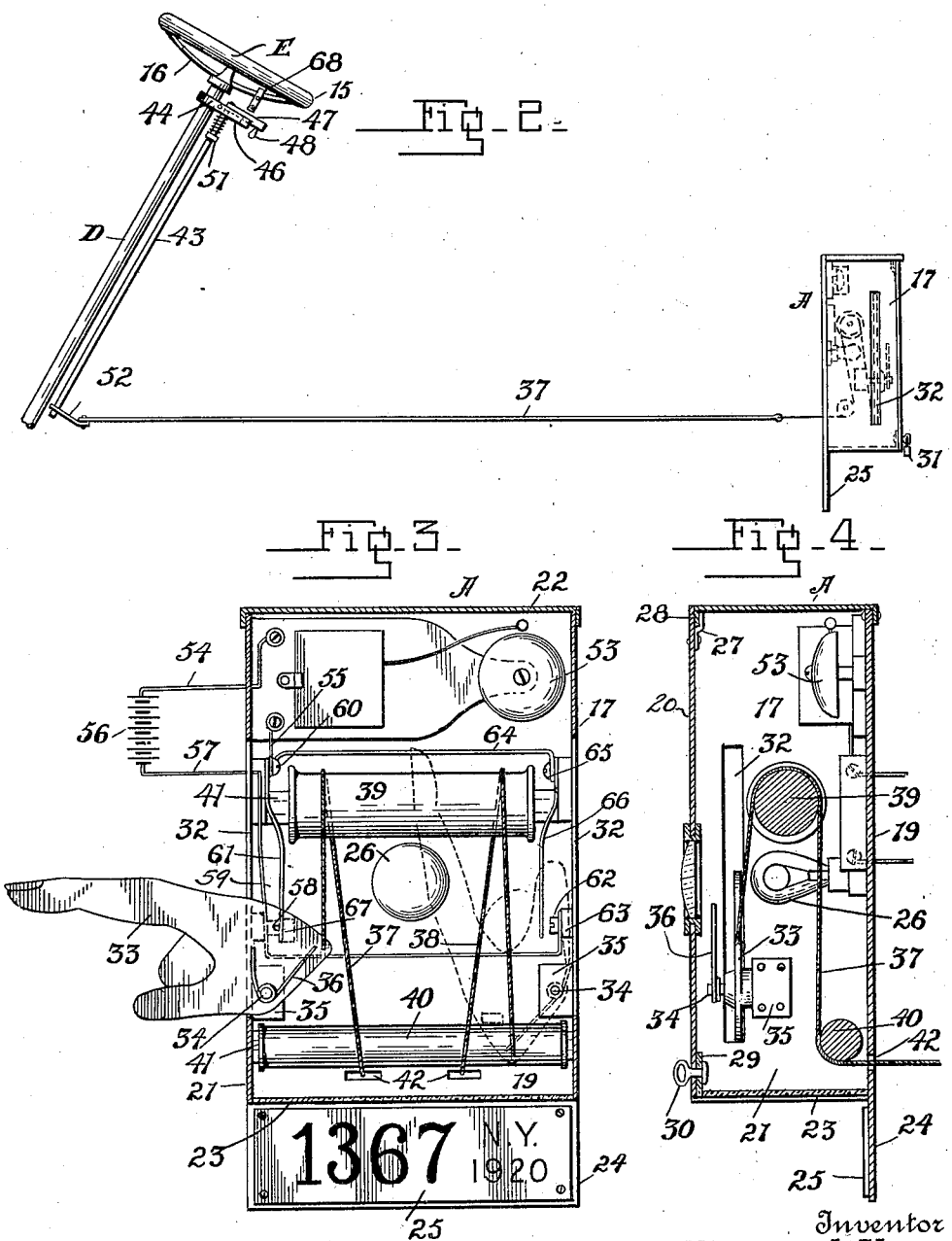

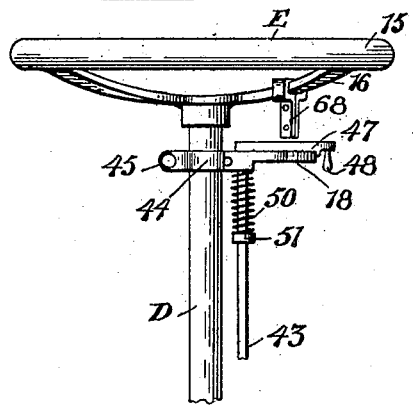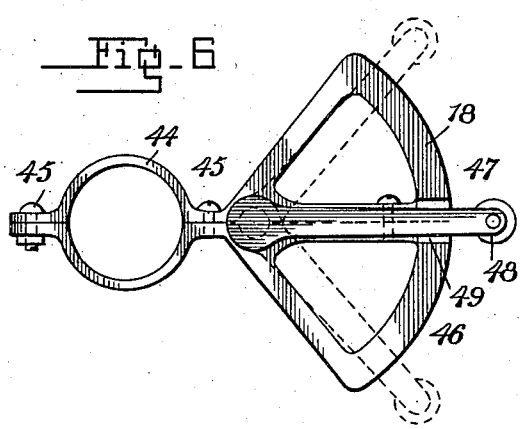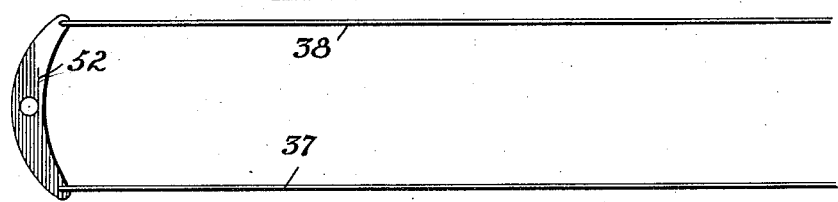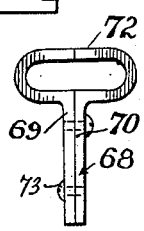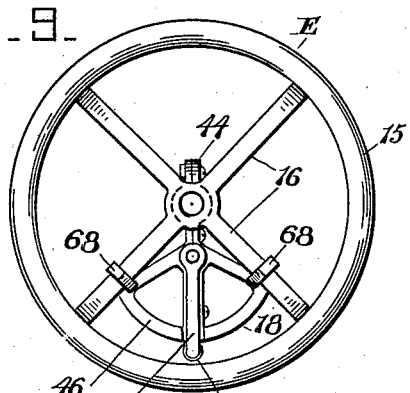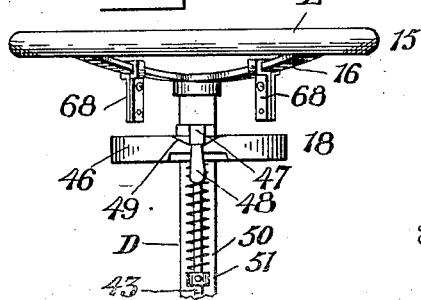

1,479,528

UNITED STATES PATENT OFFICE.

WELLINGTON WILSON, OF BROOKLYN, NEW YORK.

DIRECTION INDICATOR FOR VEHICLES.

Application filed April 23, 1920. Serial No. 376,040.

*To all whom it may concern:*

Be it known that I, WELLINGTON WILSON, a citizen of the United States, residing at Brooklyn, in the county of Kings and State of New York, have invented certain new and useful Improvements in Direction Indicators for Vehicles, of which the following is a specification.

This invention relates to signals, and the primary object of the invention is to provide an improved signalling attachment for motor vehicles which is so constructed as to permit the driver of a vehicle to indicate to persons or vehicles in the rear of his machine the direction he is going to take without removing his hand from the steering wheel of the vehicle.

Another object of the invention is to provide an improved direction indicating device for motor vehicles which when in operation will actuate an audible signal, so as to call the attention of drivers of vehicles in rear of the machine with the signal to the direction indicator thereby insuring that the drivers of the vehicles in rear of the vehicle equipped with the direction indicator will not overlook the direction indicator signal.

A further object of the invention is to provide an improved direction indicating device for motor vehicles embodying a casing having a pair of pivoted indicating hands mounted therein, and means carried by the steering post for operating either one of said hands, so as to cause the same to swing into view and thus indicating to vehicles in rear thereof the direction in which the vehicle ahead is going to move.

A further object of the invention is to provide an improved direction indicator signalling device having an improved means for manually operating the indicating hand and means for automatically returning the operating means to normal position by the steering wheel of the vehicle, so that when the vehicle starts to turn the indicating hands will be returned to their normal position.

A further object of the invention is to provide an improved means for operating the indicating hand embodying a pivoted lever carried by the steering post, the steering wheel having means arranged to engage the lever when the same is moved to a position for operating either one of the indicating hands, the lever normally lying out of the path of said means carried by the steering wheel so as to permit the free use of the steering wheel when the direction signal is not being used.

A still further object of the invention is to provide an improved direction indicator for motor vehicles of the above character which is durable and efficient in use, one that is simple and easy to manufacture, one that can be placed upon the market at a reasonable cost, and one which can be placed upon motor vehicles now upon the market.

With these and other objects in view, the invention consists in the novel construction, arrangement and formation of parts as will be hereinafter more specifically described, claimed and illustrated in the accompanying drawings, forming a part of this specification, in which drawings:

Figure 1 is a side elevation of a motor vehicle equipped with the improved direction indicating device.

Figure 2 is a side elevation of the improved direction indicating device showing the same in operative position on a steering post of a vehicle.

Figure 3 is a vertical section through the casing carrying the direction indicator pointers, one of the same being shown in its indicating position, the other pointer being shown in dotted lines so as to clearly show the circuit closing means arranged in rear thereof.

Figure 4 is a vertical transverse section through the casing.

Figure 5 is an enlarged fragmentary side elevation of a steering wheel showing the same equipped with the operating means for the indicating pointers carried by the casing.

Figure 6 is an enlarged plan view of the operating means for the indicating pointers which is adapted to be secured to the steering post of a motor vehicle.

Figure 7 is a detail plan view of the operating lever and cables for the indicating pointers which is operatively connected with the operating lever carried by the steering post.

Figure 8 is an enlarged detail elevation of one of the members carried by the steering wheel for returning the operating means for the indicating pointer to its normal position after one of the indicating pointers has been moved to an indicating position.

Figure 9 is a plan view of the steering wheel showing the operating means for the direction signal secured thereto, and Figure 10 is a front elevation of a steering wheel and post showing the improved operating means secured thereto.

Referring to the drawings, in detail, wherein similar reference characters designate corresponding parts throughout the several views, the letter A generally indicates the improved direction indicator, and B the vehicle with which the same is associated. The vehicle B may be of any preferred make, style or size, either of the pleasure or commercial type, and as shown includes the chassis C having the usual steering post D and the steering wheel E. The steering wheel E includes the rim 15 and the connecting spokes 16.

The improved direction indicator A includes a casing 17 which is adapted to be secured to the rear end of the vehicle chassis C, as clearly shown in Figure 1 of the drawings, and the operating means 18, which is adapted to be secured adjacent to the driver's seat of the vehicle B.

The casing 17 includes a rear wall 19, a front wall 20, side walls 21, a top wall 22, and a bottom wall 23. The rear, front, side and top walls are preferably formed of opaque material such as metal or the like, while the bottom wall 23 is preferably formed of transparent or translucent material such as glass, isinglass, celluloid or the like for a purpose which will hereinafter more fully appear. The rear wall 19 is formed relatively longer than the side and front walls so as to provide an extension 24 to which is adapted to be secured the license plate 25. An electric lamp 26 is arranged in the casing and is carried by the central portion of the rear wall 19 and the rays of light from the lamp are adapted to shine through the lower wall 23 and illuminate the license plate 25. The front wall 20 is removably carried by the casing so as to permit access to the interior of the casing when necessary and the front wall is held in place by suitable angle plates 27, which are adapted to engage the depending flange 28 carried by the top wall 22. A transversely extending cross strip 29 is arranged adjacent to the lower end of the casing and this strip swivelly carries an eye 30 which is adapted to extend through a suitable slot formed in the front wall. A padlock or the like 31 can be associated with the eye 30 so as to prevent the removal of the front wall and thereby prevent entrance into the casing by unauthorized persons.

The side walls of the casing are provided with longitudinally extending slots 32 through which are adapted to extend the indicating pointers 33 which are shaped to simulate the appearance of a human hand with the index finger extended. When the indicators 33 are in their extended positions, the rays of light from the lamp 26 are adapted to shine through the slots 32 and illuminate the indicators 33 which is essential for night driving. The pointers 33 are rotatably mounted upon shafts 34 adjacent to their lower ends and these shafts 34 are carried by suitable blocks 35 secured to the side walls 21 of the casing. Springs 36 are provided for normally holding the pointers 33 in a raised position and against movement and one end of these springs are secured to the pointers while the opposite ends engage the inner surface of the side walls of the casing. The pointers 33 are adapted to be swung out of the casing and through the slots 32 by means of flexible cables 37 and 38 and these cables are secured to the lower ends of the pointers at one side of the pivot points thereof. These cables 37 and 38 are trained around suitable rollers 39 and 40 which are rotatably mounted in bearings 41 secured to the inner surface of the side walls of the casing. These cables 37 and 38 extend through relatively short slots 42 which are formed in the rear wall 19 of the casing and these cables are adapted to be secured to the operating means 18 which will be hereinafter more fully described.

The operating means 18 consists of a shaft 43 which is arranged parallel with the steering post D and is connected thereto by means of a split collar 44 which extends around the steering post adjacent to the upper end thereof. The portions of the split collar 44 are held in place by suitable fastening elements 45. The outer ends of the split collar 44 carries a sector plate 46, which is arranged directly below the steering wheel E. The shaft or rod 43 is rotatably carried by the sector plate 46 and has secured to its upper end an operating lever 47, which is provided with a handle 48 so as to permit the convenient operation thereof. The upper surface of the sector plate 46 adjacent to the central portion thereof is provided with a slot 49 and the lever 47 is adapted to be normally held in engagement with the walls of the slot by means of an expansion coil spring 50 which is coiled around the shaft or rod 43 and this spring has its terminals bearing against the sector plate 46 and against the collar 31 secured to the rod or shaft 43. When the lever 47 is in the slot 49 both of the indicating pointers 33 are in their normal non-indicating position. The lower end of the shaft or rod 43 has secured thereto the arcuate two arm lever 52 and the terminals of the lever have secured thereto the flexible cables 37 and 38. Thus it can be seen that when the lever 47 is moved in one direction the two arm lever 52 will be operated which will pull on one of the cables 37 or 38 and slacken up on the other cable which will pull on one of the indicating pointers 33 and thus swing the same on the shaft 34 and move the same through the slot 32 out of the casing.

An audible signal is provided for calling the attention to the indicating device when either one of the indicating pointers is in its extended position and this audible signal includes an electric bell 53, of the ordinary or any preferred type, and the binding posts of the electric bell has secured thereto electric wires 54 and 55. The wire 54 extends to one pole of a suitable source of electricity 56 and the other pole of the source of electricity has connected thereto a wire 57 which leads to one terminal 58 of an electric switch 59 which is arranged directly above and adjacent to the pivot point of one of the indicating pointers 33. The wire 55 extends to a binding post which supports the spring contact 61 of the electric switch 59 and it can be seen that when the spring contact 61 is moved into contact with the contact 58 the circuit to the electric bell will be closed, thus operating the same. The wire 57 is extended from the contact 58 across the casing to a contact 62 of an electric switch 63, which is arranged directly above and adjacent to the pivot point of the other indicating pointer 33. A wire 64 is extended from the binding post 60 to the binding post 65 which supports the movable spring contact 66 of the electric switch 63 and it can be seen that when the movable spring contact 66 is moved into engagement with the stationary contact 62 of the switch 63 that the circuit to the electric bell will also be closed. The inner surface of each one of the indicating pointers 33 carries a block 67 which is arranged to one side of the pivot point of the pointers and when either one of the pointers are operated one of the blocks 67 will be moved into engagement with the movable portions of the switches and thus close the circuit to the electric bell.

The spokes 16 of the steering wheel E on each side of the operating lever 47 is provided with a depending lug 68 the lower end of which clears the upper surface of the operating lever 47 when the same is positioned in the notch 49 formed in the sector plate 46. Each of the lugs 68 includes a pair of sections 69 and 70, the upper ends of which carry arcuate extensions 72 which are shaped to conform to the configuration of the spokes 16 of the steering wheel E and these sections 69 and 70 are firmly clamped in position by suitable fastening elements 73.

In operation of the improved signal, when the driver of the vehicle is going to turn, the handle 48 is grasped and the lever 47 is moved upwardly out of the notch 49 and the same is swung in the direction in which the vehicle is to be turned. This will tighten up on one of the cables 39 and swing one of the indicating pointers 33 to its extended position against the tension of the spring 36, thus indicating to vehicles in the rear which direction the vehicle ahead is going to take. This also closes the circuit to the electric bell and the same is operated which will also call the attention of drivers of vehicles in the rear thereof to the fact that the vehicle ahead is going to change its course. When the lever 47 is moved out of the notch 29 the same extends into the path of depending lugs 68 and when the driver of the vehicle starts to turn, one of the lugs 68 will engage the lever 47 and return the same to its normal position. As soon as the lever 47 is returned to its normal position, the indicating pointer which has been operated will return to its normal position inside of the casing by means of the spring 36.

From the foregoing description it can be seen that an improved and simple form of direction signal for motor vehicles has been provided which when operated will be automatically returned to its normal position by the steering wheel of the vehicle with which it is associated.

Changes in details may be made without departing from the spirit or scope of the invention; but,

I claim:

1. In a direction indicator for vehicles, a casing including side walls having longitudinally extending slots formed therein, and a rear wall having spaced transversely extending aligned slots formed therein below the longitudinally extending slots, a pair of indicating pointers pivotally mounted within the casing at their lower ends and arranged to extend through the longitudinally extending slots and out of the casing when in their lowered positions, means for normally holding the pointers in their raised position in said casing, a single guide roller disposed in the casing above the pivot points of the pointers, a single guide roller disposed in the casing below the pivot points of the pointers and adjacent to the transversely extending slots, and flexible cables secured to the pointers at one side of the pivot points thereof and trained about the said guide rollers and extended through said transverse slots.

2. In a direction indicator for vehicles, a casing including side walls having longitudinally extending slots formed therein, and a rear wall having transversely extending slots formed therein, indicators pivotally secured to the casing arranged to extend through the longitudinal slots, an actuating cable for each of said indicators secured thereto at one side of the pivot points thereof, a single guide roller for each one of said cables extending transversely of the casing and journalled to the side walls thereof, said roller being disposed above the pivot points of the indicators, and a second single guide roller for both of said cables disposed below the first mentioned guide roller and arranged adjacent to said transverse slots, the cables being threaded through said slots.

3. In a direction indicator for vehicles, a casing including side walls having longitudinally extending slots formed therein, a rear wall having transversely aligned spaced transverse slots formed therein, a pair of indicating pointers pivotally mounted within the casing at their lower ends adjacent to said longitudinally extending slots and arranged to extend through said slots and out of said casing when in their lowered position, spring means engaging said indicating pointers for normally holding the indicating pointers in a raised position in said casing, an actuating cable for each of said indicating pointers connected to said pointers at one side of the pivot points thereof, a single upper guide roller for said cables rotatably carried by said side walls of the casing, said roller extending transversely of the casing and arranged substantially at the longitudinal center thereof, a lower single guide roller for both of said cables rotatably carried by the side walls of the casing and disposed in relatively close proximity to the rear wall and adjacent to the transverse slots, the cables being threaded through said transverse slots, and guide flanges formed on the terminals of said upper and lower guide rollers.

4. In an attachment for motor vehicles, a casing including opaque side walls having longitudinally extending slots formed therein, an opaque rear wall having transversely extending and aligned slots formed therein, an opaque front wall, a colored translucent plate formed in the front wall, a transparent rear wall, an opaque upper wall, the opaque rear wall being extended below the transverse lower wall, and a lamp disposed in said casing in such a manner as to permit the light rays thereof to emanate through the longitudinally extending slots, the transparent lower wall, and the colored translucent plate, and indicating members adapted to extend through said longitudinally extending slots.

WELLINGTON WILSON.